United States Patent Office 3,149,914
Patented Sept. 22, 1964

3,149,914
PRODUCTION OF HYDROGEN CYANIDE
Frederick James Bellringer, Leatherhead, and Frank Christopher Newman, Great Bookham, England, assignors to The Distillers Company Limited, Edinburgh, Scotland, a British company
No Drawing. Filed June 9, 1961, Ser. No. 115,888
Claims priority, application Great Britain June 21, 1960
16 Claims. (Cl. 23—151)

The present invention relates to the manufacture of hydrogen cyanide from methanol.

According to the present invention, the process for the production of hydrogen cyanide comprises passing methanol with ammonia and oxygen in the vapor phase at reaction temperature over a catalyst selected from the group consisting of (i) a mixture consisting of the oxides of antimony and tin, and (ii) a compound consisting of antimony, tin and oxygen.

The catalysts used in the process of the present invention may be regarded either as a mixture of antimony tetroxide with stannic oxide or as a compound of antimony, tin and oxygen; under the reaction conditions either or both forms may be present in the catalyst. The catalyst may be prepared from any of the oxides of antimony and tin, or from compounds of tin or antimony which on heating in the presence of an oxygen-containing gas, such as air, are converted to the oxides. Oxides of antimony and tin, or substances yielding these oxides, which may be used in the manufacture of the catalytic composition include antimony trioxide, antimony tetroxide, antimony pentoxide or mixtures of such oxides; stannic oxide, stannous oxide, or mixtures of such oxides. Hydrated forms of these oxides may also be used, for instance such as are formed by the action of aqueous nitric acid on antimony or tin metals or on mixtures of the metals. The catalyst may be prepared for instance by mixing together any of the oxides of antimony and tin, or substances yielding these oxides, and subjecting the mixture to a heat-treatment in the presence of an oxygen-containing gas such as air, for instance at a temperature between 550° and 1100° C. Where the initial components are antimony tetroxide and stannic oxide themselves, it is still preferred to subject the mixture to a prior heat-treatment with or without oxygen for instance at a temperature between 550° and 1100° C.

A particularly preferred method of preparing the antimony oxide/tin oxide catalyst comprises intimately mixing stannic oxide or the hydrated oxide obtained by the action of aqueous nitric acid on tin metal, with antimony pentoxide, antimony tetroxide, or the hydrated oxide formed by the action of aqueous nitric acid on antimony metal, and heat-treating the resulting mixture at 550° to 1100° C. in the presence of an oxygen-containing gas such as air.

Another preferred method of preparing the antimony oxide/tin oxide catalyst comprises hydrolysing with water cationic salts of the metals, such as the chlorides, and recovering and heating the resulting precipitate. To obtain complete hydrolysis it may be necessary to add a volatile base such as ammonia. Either or both of the metal oxide components of the composition may be prepared in this way. Particularly useful catalysts can be prepared by this method from stannic chloride and antimony pentachloride by mixing them together in aqueous media and adding ammonia until the pH is greater than 5.0, recovering the precipitate and heating it at a temperature between 550° and 1100° C.

When the tin and antimony compounds in the mixture are present in the lower valency state, i.e., as divalent tin or trivalent antimony compounds, it is particularly preferred to subject the mixture to a preliminary heat-treatment in an atmosphere comprising oxygen and an inert gas such as nitrogen, carbon dioxide or steam, the temperature being controlled so that no part of the catalyst during this preliminary heat-treatment exceeds a temperature of about 650° C.; in this way loss of the lower valent metallic compounds by volatilisation is avoided. A convenient way of doing this is to heat pellets of the catalyst in a furnace, the temperature of which is raised from about 300° to about 650° C. over a period of not less than about 8 hours, while passing a stream of air over the catalyst. After this preliminary heat-treatment, the mixture is then subjected to a final heat-treatment in air at a temperature in the range 550° to 1100° C.

The atomic ratio of tin to antimony in the catalyst may vary within moderately wide limits, for instance between 0.1:1 and 20:1, although compositions containing proportions of tin to antimony outside this range may be useful for some purposes.

The catalytic composition of the present invention may, if desired, be deposited on a support such as silica.

By whichever method the oxides or hydrated oxides have been prepared, the mechanical stability of the finished catalyst is enhanced by washing preferably with water before drying.

The process of this invention may be carried out in the presence of inert diluents, such as steam or nitrogen, and the oxygen required in the reaction may conveniently be supplied in the form of air. It is preferred to use steam or mixtures of steam and nitrogen as diluent.

Any suitable method of carrying out vapour-phase catalytic reactions may be employed; for example the reactants may be passed over one or more fixed catalyst beds, if desired with interstage cooling. Moving bed or fluidised bed techniques may also be used. The contact times of the gas mixture with the catalyst depend on a number of factors, including the reaction temperature, the method of preparation of the catalyst, and the desired degree of methanol conversion.

The proportions of methanol in the reaction mixture may vary within fairly wide limits, for example between 1% and 10% by volume. The proportion of ammonia present in the reaction mixture will be varied accordingly, and is preferably such as to give a molar ratio of ammonia to methanol of between 1:2 and 2:1. Similarly the proportion of oxygen required for the reaction may vary, for instance between 1 and 20% volume, and is preferably not less than the molar equivalent of the methanol present.

The reaction is carried out at an elevated temperature, for example between 350° and 600° C. Suitably, the reaction vessel is operated at approximately atmospheric pressure but higher or lower pressures may be employed.

The contact time for the reaction, which is defined as the volume of catalyst divided by the volume of gaseous reactants fed per second, measured at room temperature and pressure, may vary between wide limits depending on the temperature and other reaction conditions but is suitably between 0.1 and 10 seconds, preferably 1 to 5 seconds.

Hydrogen cyanide may be recovered from the reaction products of the process of this invention by removal of the excess ammonia with aqueous acid, and absorption of the required product in water, from which solution concentrated hydrogen cyanide may be obtained by distillation.

Alternatively alkali metal cyanides may be prepared directly by absorption of the hydrogen cyanide in a solution of an alkali hydroxide or carbonate.

EXAMPLE 1

Powdered tin (190 parts by weight) was added in small proportions to a boiling solution of nitric acid (800 parts by volume of concentrated nitric acid in 3200 parts by weight of water). Powdered antimony (97.6 parts by weight) was added in small portions to warm concentrated nitric acid (400 parts by volume). Both mixtures were boiled until no further brown nitrous fumes were evolved. While still hot the antimony oxide suspension was added to the tin mixture with stirring, the precipitate was filtered off, washed with water, dried and sieved to give granules of less than 30 mesh B.S.S. pelleted and heated in air to a temperature of 725° C. over a period of 12 hours, maintained at this temperature for a further 16 hours, and then at 1000° C. for 16 hours. The catalyst had an atomic ratio of tin to antimony of 2:1.

The catalyst was placed in a reactor and was used in the manufacture of hydrogen cyanide at various temperatures with the results shown in Table 1.

*Table 1*

| Feed composition percent v./v. | | | | Temp, ° C. | Contact time, secs. | Yield percent based on MeOH fed to reactor | | |
|---|---|---|---|---|---|---|---|---|
| $NH_3$ | MeOH | Air | $H_2O$ | | | HCN | $CO_2$ | CO |
| 6.5 | 5.0 | 53.4 | 35.1 | 400 | 3.8 | 30 | 1.0 | |
| 6.8 | 5.3 | 52.3 | 35.6 | 445 | 3.8 | 64 | 5.9 | |
| 6.9 | 5.3 | 51.5 | 36.3 | 485 | 3.8 | 82 | 13.2 | |
| 6.3 | 5.2 | 54.7 | 33.8 | 485 | 1.9 | 88 | 8.4 | 2.8 |

EXAMPLE 2

A catalyst containing tin and antimony in the ratio 1:2, Sn:Sb was prepared by the method of Example 1, and given the same heat-treatments as in that example. The catalyst was used in the manufacture of hydrogen cyanide with the results shown in Table 2.

*Table 2*

| Feed composition percent v./v. | | | | Temp, ° C. | Contact time, secs. | Yield percent based on MeOH fed to reactor | | |
|---|---|---|---|---|---|---|---|---|
| $NH_3$ | MeOH | Air | Water | | | HCN | $CO_2$ | CO |
| 5.9 | 4.9 | 56.1 | 33.1 | 460 | 4.2 | 59.4 | 3.0 | 0.6 |
| 6.0 | 4.8 | 56.3 | 32.8 | 480 | 4.0 | 80.3 | 8.6 | 2.9 |
| 6.0 | 4.9 | 55.4 | 33.5 | 490 | 4.1 | 81.2 | 11.5 | 5.8 |
| 5.4 | 4.8 | 57.7 | 32.1 | 495 | 3.8 | 68.2 | 0 | 0 |
| 5.6 | 4.8 | 57.1 | 32.5 | 503 | 3.9 | 70.0 | 0 | 0 |
| 5.8 | 4.8 | 56.9 | 32.4 | 533 | 3.9 | 78.5 | 5.8 | 0 |

EXAMPLE 3

A catalyst containing tin and antimony in the ratio 1:1, Sn:Sb, was prepared and heat-treated as in the previous examples and used for the manufacture of hydrogen cyanide with the results shown in Table 3.

*Table 3*

| Feed composition percent v./v. | | | | Temp, ° C. | Contact time, secs. | Yield percent based on MeOH fed to reactor | | |
|---|---|---|---|---|---|---|---|---|
| $NH_3$ | MeOH | Air | Water | | | HCN | $CO_2$ | CO |
| 5.8 | 4.6 | 58.1 | 31.4 | 440 | 4.1 | 65.5 | 4.9 | 0 |
| 5.9 | 4.8 | 56.7 | 32.6 | 460 | 3.9 | 75.2 | 5.8 | 5.8 |
| 6.1 | 4.9 | 55.9 | 33.1 | 470 | 4.0 | 80.0 | 10.0 | 10.0 |

We claim:
1. The process for the production of hydrogen cyanide which comprises passing methanol with ammonia and oxygen in the vapour phase at reaction temperature over a catalyst selected from the group consisting of
   (i) a mixture consisting of the oxides of antimony and tin, and
   (ii) a compound consisting of antimony, tin and oxygen.

2. The process as claimed in claim 1 wherein the catalyst consists of antimony tetroxide in admixture with stannic oxide.

3. The process as claimed in claim 1 wherein the catalyst is formed by heating at a temperature in the range 550° C. to 1100° C. a mixture of antimony tetroxide with stannic oxide.

4. The process as claimed in claim 1 wherein the catalyst is formed by heating at a temperature between 550° and 1100° C. in the presence of oxygen at least one of the oxides, stannous oxide, stannic oxide and the hydrated oxide which is obtained by the action of aqueous nitric acid on tin metal, together with at least one of the oxides antimony trioxide, antimony tetroxide, antimony pentoxide and the hydrated oxide which is obtained by the action of aqueous nitric acid on antimony metal.

5. The process as claimed in claim 4 wherein the catalyst is formed by heating at a temperature between 550° and 1100° C. in the presence of oxygen the mixture of hydrated oxides which is obtained by the action of aqueous nitric acid on a mixture of tin and antimony metals.

6. The process as claimed in claim 1 wherein at least one of the antimony and tin oxides is formed by hydrolysing with water a cationic salt of the metal and heating the resulting hydrated oxide at a temperature between 550° and 1100° C.

7. The process as claimed in claim 6 wherein the hydrolysis is carried out in the presence of a volatile base.

8. The process as claimed in claim 7 wherein the volatile base is ammonia.

9. The process as claimed in claim 6 wherein the cationic antimony salt is antimony pentachloride.

10. The process as claimed in claim 6 wherein the cationic tin salt is stannic chloride.

11. The process as claimed in claim 6 wherein the catalyst is formed by making a mixed aqueous solution of antimony pentachloride and stannic chloride, adding ammonia until the pH of the mixture is greater than 5, and recovering and heating the precipitate at a temperature between 550° and 1100° C.

12. The process as claimed in claim 4 wherein the heat-treatment of the catalyst is carried out in the presence of oxygen in two stages, in the first of which the temperature is controlled so that no part of the catalyst exceeds a temperature of about 650° C. whereby oxides other than stannic oxide and antimony tetroxide are converted into those oxides.

13. The process as claimed in claim 12 wherein the first heat-treatment of the catalyst is carried out by raising the temperature of the catalyst from about 300° to about 650° C. over a period of not less than about 8 hours while passing a stream of air over the catalyst.

14. The process as claimed in claim 1 wherein the atomic ratio of tin to antimony in the catalyst is between 0.1:1 and 10:1.

15. The process as claimed in claim 1 wherein the reaction is carried out in the presence of an inert gaseous diluent selected from the group consisting of steam and mixtures of steam and nitrogen.

16. The process as claimed in claim 1 wherein the reaction is carried out at a temperature between 350° and 600° C.

References Cited in the file of this patent
UNITED STATES PATENTS

| 1,765,352 | Jaeger | June 16, 1930 |
| 1,914,557 | Craver | June 20, 1933 |
| 1,934,838 | Andrussow | Nov. 14, 1933 |
| 2,006,981 | Andrussow | July 2, 1935 |